United States Patent [19]
Lekarski et al.

[11] 3,797,520
[45] Mar. 19, 1974

[54] FLUID OPERATED LOGIC ELEMENTS

[75] Inventors: Simeon Lekarski, Saint-Cloud; Pierre Hardy; Leon Hardy, both of Paris, all of France

[73] Assignee: Jean Gachot, Enghien-Les-Baines, France; a part interest

[22] Filed: June 30, 1971

[21] Appl. No.: 158,218

[30] Foreign Application Priority Data
July 2, 1970   France ............................... 70.24652

[52] U.S. Cl. ............. 137/517, 235/201 ME, 251/65
[51] Int. Cl. ............................................. F16k 15/00
[58] Field of Search ............... 235/201 ME; 251/65; 137/517, 552.5, 829, 830, 831

[56] References Cited
UNITED STATES PATENTS

| | | | |
|---|---|---|---|
| 3,101,093 | 8/1963 | White | 137/512.5 X |
| 3,246,662 | 4/1966 | Shebanow | 137/82 |
| 2,667,895 | 2/1954 | Pool et al. | 251/65 X |
| 2,991,805 | 7/1961 | Page | 235/201 ME X |
| 3,070,295 | 12/1962 | Glattli | 235/201 ME |
| 3,279,487 | 10/1966 | Elam | 251/65 X |
| 3,326,239 | 6/1967 | Saint-Joanis et al. | 235/201 ME X |
| 3,362,633 | 1/1968 | Freeman | 235/201 ME |
| 3,368,788 | 2/1968 | Padula | 251/65 |
| 3,483,883 | 12/1969 | Hartman | 235/201 ME X |
| 3,493,173 | 2/1970 | Monge et al. | 235/200 PF |
| 3,527,248 | 9/1970 | Western-Pick | 251/65 X |
| 3,584,639 | 6/1971 | Potepalov et al. | 235/201 ME X |

FOREIGN PATENTS OR APPLICATIONS
1,008,888   11/1965   Great Britain ........................ 251/65

OTHER PUBLICATIONS
W. C. Carter, "Shift Register Counters," IBM Technical Bulletin, Vol. 12, No. 7, December, 1969.

Primary Examiner—Alan Cohan
Assistant Examiner—Gerald A. Michalsky

[57] ABSTRACT

Fluid-operated logic elements are disclosed which comprise a compartment, a plurality of fluid passages communicating with the compartment and a member which is movable within the compartment by fluid from one of the passages to control the intercommunication between passages.

The member is magnetic and is arranged to coact magnetically with other magnetic means associated with the compartment to define at least one stable position for the member in the compartment. The number and relative positions of passages and the number of stable positions of the member determine the logical function of the element.

The elements can be combined in various ways to provide logic systems.

1 Claim, 40 Drawing Figures

Inventors
SIMEON LEKARSKI, PIERRE
HARDY, AND LEON HARDY
By John Lyden
Attorney

FLUID OPERATED LOGIC ELEMENTS

The object of the present invention is an improvement to fluid-operated logical elements and to the computer and automatisation circuits incorporating such elements.

It is an accepted practice to use logical elements of two types, static or dynamic, in fluid-operated logical circuits.

Static fluid elements may carry out a memory function, though this can be maintained for only a relatively short time, in addition to which the memory ceases to exist as soon as the fluid feed is cut off.

Dynamic elements, too, can be used to provide a memory function; among these, the slide-valve type is the most frequently used, because it renders the memory far more stable, by comparison with static elements, though it has drawbacks of its own, such as taking up more space and being not very reliable.

According to the invention, use is made of fluid-operated logical elements in which at least one free flap is fitted with freedom to move within a compartment containing apertures connected to a logical circuit, at least one of the apertures serving to admit fluid capable of moving the flap from one position to another, the particular feature being that at least one flap is subjected, along with the fluid, to the action of at least one magnetic field, being thereby fixed in at least one predetermined stable position.

By suitable combinations of the different actions of at least one magnetic field on one or several flaps, by the use of different areas, of a varying number of apertures and of various pressures, it is possible to obtain innumerable logical elements.

These fluid-type logical elements conforming to the invention can operate at very low pressures, including such pressures as are used with static fluid logical elements, or at high pressures such as those used with dynamic logical elements.

The fluid employed with these logical elements may consist of a gas or a liquid.

Further features and advantages of the invention will be more clearly understood from the following description of various practical examples and from reference to the accompanying drawings, in which:

FIGS. 10 and 10b are a cross-section and diagram respectively of a bistable element with a single outlet;

Various forms of fluid-operated logical elements embodying the principle of the invention, in which at least one flap is subjected to the action of a magnetic field, are shown in FIGS. 1 to 5.

Figure 1A:
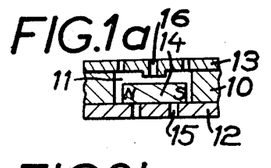
FIGS. 1a and 1b are cross-sections of fluid-operated logical elements, showing how the magnetised parts are arranged in relation to the magnetic components.

FIG. 1a represents such an element consisting of an intermediate plate of non-magnetic material, 10, in which is a compartment, 11, closed by two outer plates, 12 and 13, made of magnetic material, between which lies the intermediate plate 10. Inside the compartment 11 is a free flap, 14, consisting of a permanent magnet, which can be pulled towards the faces of the outer plates 12 and 13, thereby selectively closing apertures such as 15 and 16, which are connected to a fluid-controlled logical circuit. At least one of these apertures 15 and 16 admits fluid under pressure capable of selectively moving the flap 14 to a stable "up" or "down" position, in conjunction with the attraction of the magnetic field, so as to create a memory, as will be described in detail later.

Figure 1B:
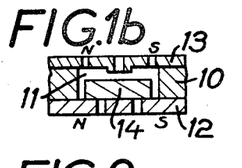

FIG. 1b shows a variant in which the outer plates 12 and 13 are magnetised so that each presents a magnetic field capable of attracting the flap of magnetic material 14.

Figure 2A:
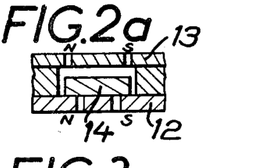
FIGS. 2a to 2c are cross-sections of the elements, showing the various stable positions of the flap.
Figures 2B, 4A:
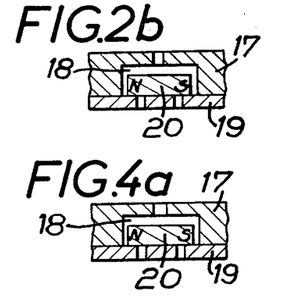
FIGS. 4a to 4d are cross-sections of elements showing various methods of sealing.
Figures 2C, 3, 4B, 4C:
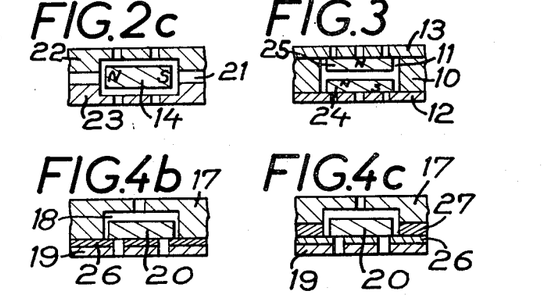
FIG. 3 is a cross-section of an element with two flaps.

Elements of three types, differing as regards the nature and number of stable positions, are shown in FIGS. 2a, 2b and 2c.

The example in FIG. 2a is a bistable element in which the flap 14 is made of magnetic material and can be selectively held against one or other face of the magnetised plates 12 and 13, giving two stable positions.

FIG. 2b shows a monostable element consisting of a plate of non-magnetic material, 17, containing a compartment, 18, the only open side of which is closed by an outer plate of magnetic material, 19. Within the compartment 18 is a flap, 20, consisting of a permanent magnet, which is attracted by the plate 19 and held to it, giving a single stable position, in the absence of fluid under pressure. In the element shown in FIG. 2c, the flap 14, in the absence of fluid under pressure, has stability in a mid-way position. The flap 14, which is a permanent magnet, is held in that position by an intermediate layer of magnetic material, 21, fitted between two outer plates of non-magnetic material, 22 and 23.

The element illustrated in FIG. 3 differs from those already described in that it has two flaps, 24 and 25, consisting of magnets positioned inside the compartment 11, which are attracted respectively by outer plates of magnetic material, 12 and 13.

If the plates 12 and 13 be made of non-magnetic material, the flaps can be maintained in a stable position by so orienting them that their magnetic fields are mutually repellent.

In FIG. 4a can be seen an element in which no sealing member is provided between the flap 20 and the plate 19, in view of the fact that these elements are intended for use in computer components operating at very high frequency, so that minor leaks, if any, could be ignored.

In the example in FIG. 4b, there is a thin flat seal, 26, made of resilient material such as rubber, for instance, fitted between the plate 19 and the flap 20.

In the variant form shown in FIG. 4c, a magnetic plate, 27, is disposed between the plate 17 and the seal 26, to avoid diminution of the force of attraction by the seal 26.

Figure 4D:
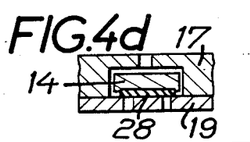

In FIG. 4d, finally, a seal, 28, is set into the flap 14 and moves with it, thereby making contact with the plate 19.

Figure 5:
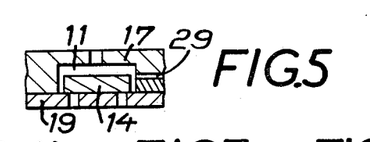
FIG. 5 is a cross-section of an element with differently placed apertures.

The element shown in FIG. 5, which is monostable, differs from those already described in having an aperture, 29, in the intermediate portion of the compartment 11.

The fluid/magnetic logical elements here proposed can have various numbers of apertures of different sizes, to suit the logical circuits in which they are incorporated.

By way of example only, FIGS. 6 to 16 show various types of fluid/magnetic elements, some of which are used in the circuits described hereunder.

Figure 6A:
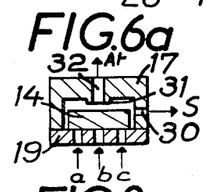
FIGS. 6a and 6b are a cross-section and diagram respectively of a multi-input monostable AND-function element.

One monostable element, seen in FIG. 6a, provides an output signal at the outlet 30 only when all signals are applied simultaneously to the $n$ inputs $a, b, c, \ldots$ This result is achieved by suitable combination of the force $F$ by which the flap 14 is attracted to the bottom plate 19, the working pressure $Pe$ of the fluid on the inputs $a, b, c, \ldots$ and the total surface area $S_n$ of all the inputs.

In the case of $n - 1$ signals, the values of these magnitudes give the following inequality:

$$Pe \times S_{n-1} < F$$

Here, the force of attraction is always greater than the force of attraction of $n - 1$ signals.

When signals are applied at all the $n$ inputs, the inequality becomes:

$$Pe \times S_n > F$$

In this case, the flap 14 abandons its stable position and comes to bear against the nozzle 31, blocking the aperture 32 open to the atmosphere.

The signals entering the apertures $a, b, c, \ldots n$ pass through the aperture 30, connected to the output of the element.

Should the blocked cross-sectional area $S.31$ of the nozzle 31 exceed the sum of the areas of the apertures, $S_n$, it will be seen that the path opening is confirmed by the usual formula. This confirmation holds good even if the area $S.31$ is (within certain limits) less than the area $S_n$, since the forces of magnetic attraction diminish as the flap moves away from its down position.

If the area $S.31$ conforms to the inequality $PE \times S.31 < F'$, in which $F'$ is the new force of attraction of the flap when in its up position, the path opening is unconfirmed, a state in which the flap, subjected to vibrations, assumes a succession of up and down positions.

In the case of confirmed opening, the result is an element which responds until the moment of opening like an element providing a logical AND function for $n$ inputs.

Should one of the inputs change to the zero state after the opening of the element, the element will not close, in which respect it differs from the AND-type logical element.

In the case of unconfirmed opening, the same change of one of the inputs to zero causes the element to assume the closed position and thus connect the output to the atmosphere. This element thus corresponds precisely to the logical AND function for $n$ inputs or to the YES function when the element has only a single input.

Figure 6B:
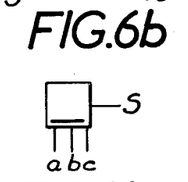
Figure 7A:
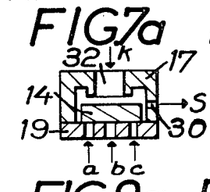
FIGS. 7a and 7b are a cross-section and diagram respectively of a multi-input monostable AND-function element with forced control in the stable position.
Figure 7B:
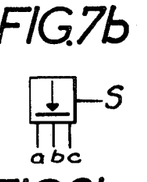

The element shown in FIGS. 7a and 7b is identical to the one in FIGS. 6a and 6b, but enables the flap to be closed when a signal $K$ of value 1 is applied in the direction of the aperture 32. The pressure of the fluid producing the signal $K$ may be equal to or less than that at the inputs $a, b, c, \ldots n$.

Figure 8A:
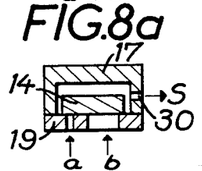
FIGS. 8a and 8b are a cross-section and diagram respectively of an element combining an AND function for n signals and a YES function for one given signal.
Figure 8B:
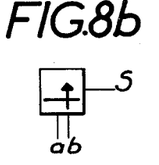

The element shown in FIGS. 8a and 8b can be opened by the signal $b$ or by the simultaneous application of signals $a$ and $b$, but it cannot be operated by application of the signal $a$ alone. This is a case of a monostable element with priority opening.

Figure 9A:
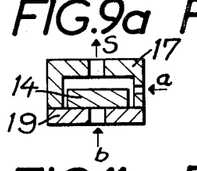
FIGS. 9a and 9b are a cross-section and diagram respectively of a monostable element permitting the emission of signals in two different directions in a pipe.
Figure 9B:
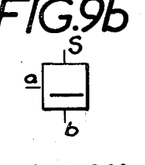

The element shown in FIGS. 9a and 9b is monostable and provides a path from $a$ to $S$ when $b$ is equal to zero and from $b$ to $a$ when $b$ is equal to 1.

Figures 10A, 10B:
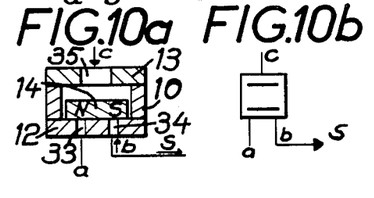

FIGS. 10a and 10b show a bistable element, which can be moved either to a stable up position by the application of signals to the inputs 33 and 34 simultaneously, or to a stable down position by application to the aperture 35.

In this element, which can be used as a memory store, writing-in is effected by the simultaneous action of signals $a$ and $b$ at the inputs 33 and 34. For reading out, one of the two apertures, say 33, is used as input, while the second aperture, 34, constitutes the output. If the stable down position of the flap be assumed to be zero and the inverse position 1, if the flap should be in the 1 position when reading out, a signal 1 will arise at the output (high pressure level). This element is designated "bistable with unilateral read-out."

Figures 11A, 11B:
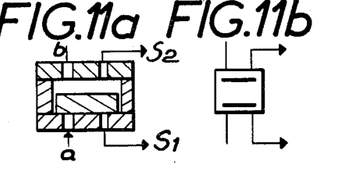
FIGS. 11a and 11b are a cross-section and diagram respectively of a bistable element with outlets in both positions.

The element shown in FIGS. 11a and 11b offers the possibility of obtaining signals at high pressure level for both positions, zero and 1, of the flap and may be termed "bistable with bilateral read-out."

Figure 12A:
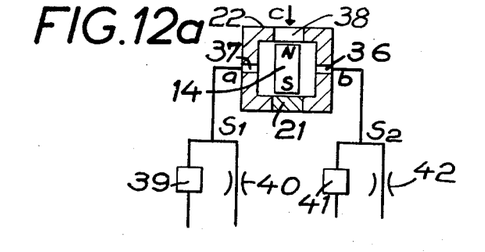
FIGS. 12a and 12b are a cross-section and diagram respectively of an element which, according to the direction in which used, can have an OR function and constitute an element serving one of the two outlets according to the parameters of the two outlets themselves.
Figure 12B:
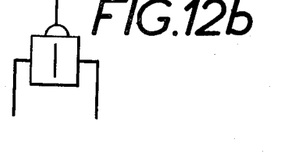

The element shown in FIGS. 12a and 12b is similar to the one described in FIG. 2c, having a stable midway position for the flap 14. Assuming the aperture 37 to be an input and the aperture 36 likewise an input, whereas the aperture 38 is an output, this element will respond like an OR element.

| a | b | S |
|---|---|---|
| 0 | 0 | 0 |
| 0 | 1 | 1 |
| 1 | 0 | 1 |
| 1 | 1 | 1 |

If this element be joined up the reverse way, that is to say using the aperture 38 as an input and the apertures 36 and 37 as outputs, it is possible to obtain three different states for these outputs, according to the impedance in the output circuits.

A capacitor and a resistor, 39 and 40 respectively, are connected in parallel to one of the outputs, S1, while another capacitor and resistor, 41 and 42 respectively, are joined in parallel to the other output, S2.

1. The capacities at 39 and 41 and the resistances at 40 and 42 are relatively equal to each other. In that case, the pressure-rise derivatives in both outputs are almost the same. Small pressure differences on the two sides of the flap 14 are offset in each instance by the stabilising action of the magnetic field on the flap. In this case, the signal 1 is obtained at each of the outlets.

2. The impedance in the S1 portion of the circuit (determined by the values of the capacitor 39 and resistor 40) is greater than the impedance in the portion S2 (determined by the values of the capacitor 41 and resistor 42). In this case, the pressure of the fluid in the output aperture 37 increases more rapidly than in the output aperture 36. When the pressure difference $\Delta p$ has a pre-determined value, the flap abandons its stable position and moves to a position in which it blocks the output 36.

3. The pressure rises more rapidly in the output aperture 36 and the flap moves to the left, blocking the output aperture 37.

Analysis of the restoring action of the element in FIGS. 12a and 12b will show that the input aperture 38 is opened when the flap 14 is in either of its extreme positions. In that case, the pressure of the fluid may fall below the value $\Delta p$ responsible for the "go" movement. This new pressure value will result in movement to the stable mid-way position. The ability of this element to select circuits according to their respective impedances is very useful for reading the state of bistable elements.

Figure 13A:
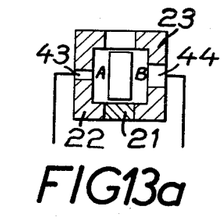
FIGS. 13a and 13b are a cross-section and diagram respectively of another form of element having the same logical function as the element in FIG. 12, but with a particular ratio in the pressures of the two signals.
Figure 13B:
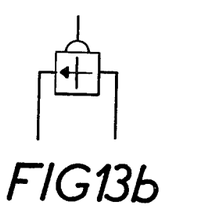

FIGS. 13a and 13b show the same element as FIGS. 12a and 12b, but plus a special feature. When the presence of a signal at the aperture 43 is followed by the presence of a signal at the aperture 44, the flap takes up the "go" position B, but in restoring it moves to the position A before the pressure of the fluid at the output has fallen below the level 1 concerned.

This action is obtained by virtue of the fact that the aperture 44 is of larger cross-sectional area than the aperture 43.

This element is a circuit selector with asymmetrical return.

Figure 14A:
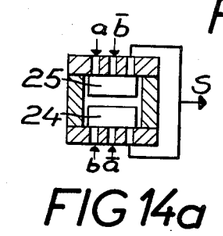
FIGS. 14a and 14b are a cross-section and diagram respectively of a two-flap element having the exclusive OR logical function.
Figure 14B:
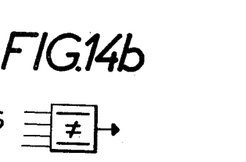

The element shown in FIGS. 14a and 14b is of the type already seen in FIG. 3 having two flaps, 24 and 25, each of which provides a two-signal AND function.

By arranging high-pressure signals such as $a$ and $b$ and their complements $\bar{a}$ and $\bar{b}$ by connecting as indicated in the circuit diagram, one can obtain the exclusive-OR logical function shown in the following table:

| a | b | S |
|---|---|---|
| 0 | 0 | 0 |
| 0 | 1 | 1 |
| 1 | 0 | 1 |
| 1 | 1 | 0 |

By this means, a single element can carry out the algebraic operation of addition without carry-over.

Figure 15A:
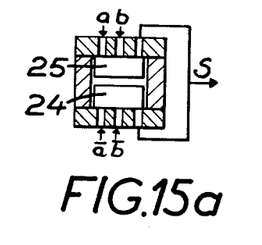
FIGS. 15a and 15b are a cross-section and diagram respectively of the same element as in FIG. 14, but with a modified circuit providing the logical function of negation of exclusive.
Figure 15B:
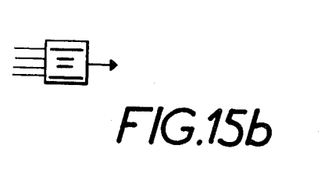

The design of the element shown in FIGS. 15a and 15b is the same as that in FIGS. 14a and 14b, but the way in which its inputs are connected to the signals $a$ and $b$ and their complements $\bar{a}$ and $\bar{b}$ results in the following logical function:

| a | b | S |
|---|---|---|
| 0 | 0 | 1 |
| 0 | 1 | 0 |
| 1 | 0 | 0 |
| 1 | 1 | 1 |

This element can be used for comparing two numerals written in binary code in the two registers, which are able to emit high-level signals both for the 1 state and for the zero state at different outputs.

Figure 16A:
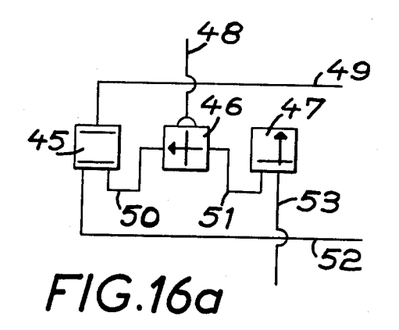
FIGS. 16a and 16b are a circuit diagram and a diagrammatic representation of a basic cell for the assembly of a matrix-type memory store, with outlets for 1 states only.
Figure 16B:
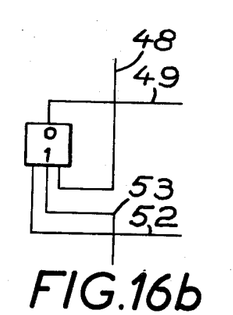

The circuit diagram in FIGS. 16a and 16b represents a cell capable of retaining the state 1 or the state zero and of emitting read-out signals for the state 1 without erasing the state written in.

This memory cell consists of a combination of a monostable element with priority opening, 47, a circuit selector element with asymmetrical return, 46, and a bistable element with unilateral read-out, 45, interconnected by a circuit described below.

For retention of the state 1 or zero, the bistable element with unilateral read-out 45 is used. Writing-in takes place as follows. Initially, the bistable element 45 occupies the zero position (stable down position) by the application of a signal by way of the line 49. The write-in is effected by the introduction of signals to the lines 52 and 48. Through the line 52 the signal arrives at one of the apertures in the element 45. The signal from the line 48 goes via the circuit selector element with asymmetrical return, 46.

According to the state of the bistable element 45, the circuit has two possible ways of functioning:

a. The bistable element 45 is in the zero state (flap in the down position) and the pressure in the lines 50 and 51 increases at equal speed in both lines. The flap in the element 46 remains in the stable mid-way position. At whatever pressure level is taken as the state 1, the flap of the monostable element 47 opens and the write-in signal passes to the line 53. If the condition as to the simultaneous presence of signals in the lines 52 and 48 be fulfilled, the flap in the bistable element 45 will move to the stable up position.

b. The bistable element 45 is in the state 1 (flap in the up position). The pressure of the fluid in the line 51 increases more rapidly than the pressure in the line 50, so that the flap in the element 46 takes up position on the left, blocking communication between the write-in signal incoming from the line 48 and the atmosphere connected to the line 52.

To sum up, the combined operation of the elements 46 and 47 causes the write-in signal to pass to the line 53, irrespective of the state of the bistable element 45. Moreover, it blocks communication with the atmosphere when the bistable element 45 is open. The write-in signal is present under all the bistable elements 45 in one and the same column which are in the zero state.

For read-out, a signal is sent through the line 52, and if the flap in the element 45 is in its stable up position, the signal passes to the line 48, which represents the cell output during read-out.

Figure 18:
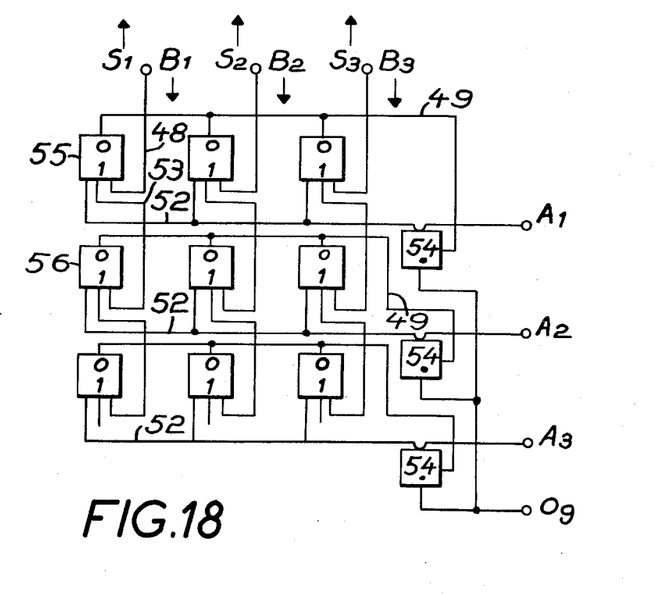
FIG. 18 is a circuit diagram of a matrix-type memory store with outlets for 1 states only.

The cell described above and illustrated in FIGS. 16a and 16b forms a basic element for the assembly of a matrix-type memory store, the circuit diagram of which appears in FIG. 18.

In that diagram, the lines 52 of all the cells in each horizontal row are joined together, the horizontal rows being indicated by the references A1, A2, ... An. The lines 49 of all the cells in a horizontal row are likewise joined together. This memory store is primarily intended to replace the role of sequential automatisation control. To that end, each sequence occupies a corresponding row An in the memory store and the components controlled are connected to the outputs Sn.

Writing into the memory store is brought about by the emission of signals in one of the lines 52 and in the columns Bn in which the state 1 is to be obtained. The matrix write-in is effected in the cells placed at the intersections of the line and the columns in which the fluid is under pressure.

Erasure of the programme is obtained for a row by applying signals to the input Og and the input An of the row concerned. The signal from An passes through the NO element 54 and is steered by the line 49 to the cells in the line An.

It is possible to erase several rows at a time by connecting the input Og and several inputs A of the rows concerned to high pressure.

The special feature of the operation of this memory store lies in the possibility of being able to retain the state 1 at any one of its outputs during sequence changing. Assuming the first-sequence cell 55 to be in the state 1, the change is made to the second sequence, where the cell is also in the state 1. This indicates that escape from the row A1 is made through the input A1, and by a slight shift the row 2 is brought under pressure. In the sequence A1, the flap in the element 46 is over to the right (FIG. 16a), blocking the line 51, and at the moment of sequence change the pressure in the lines 50 and 48 begins to fall, whereas the pressure in the line 53 increases. The element 46 shown in FIG. 13a moves to the left, blocking the line 50, as soon as the pressure in the line 51 becomes slightly higher than that in the line 50.

To obtain correct functioning of the circuit, release must take place before the pressure in the line 48 has dropped below the value considered as the state 1.

It should be added that it is necessary, if the process described above is to take place properly, for the element 47 to open before the pressure in the line 53 has reached the value required for switching the element 46.

If, during the change of sequence, the cell 56 is in the zero state, escape from the output S1 through the input A1 is complete.

Figure 19:
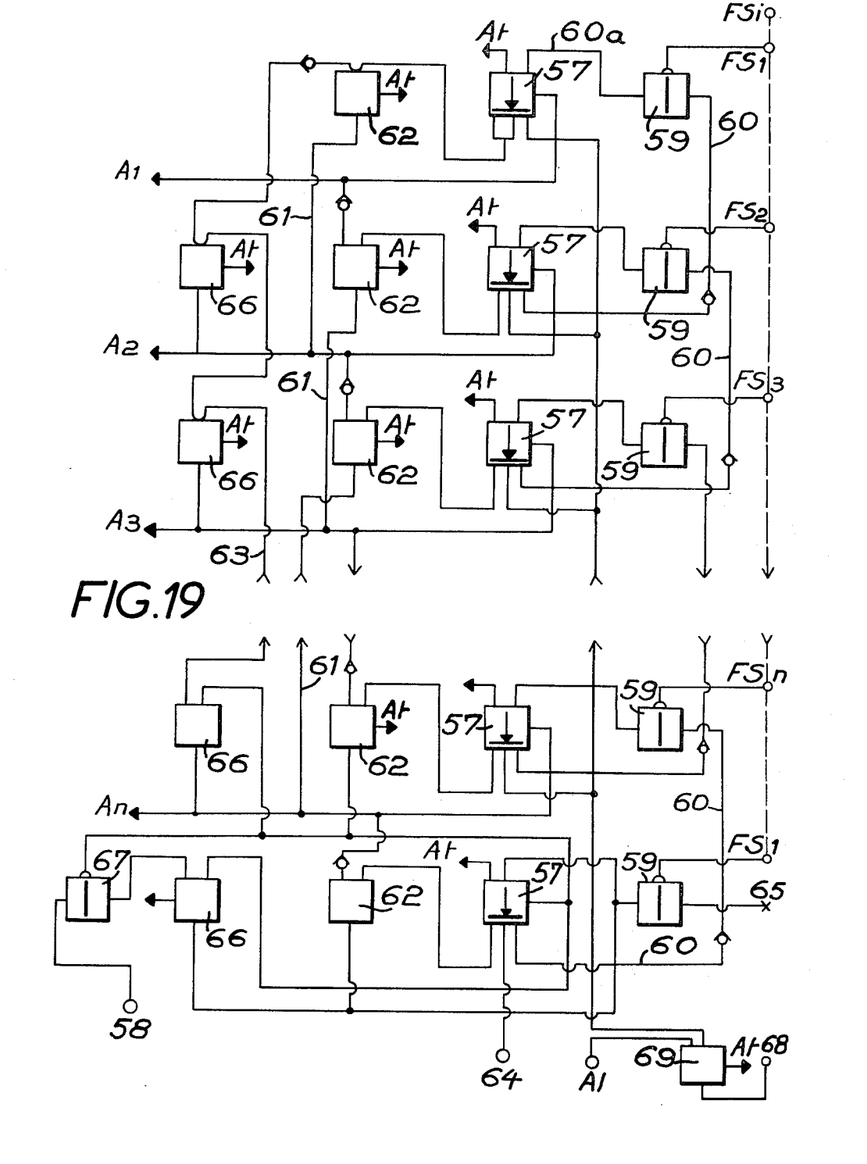
FIG. 19 is a circuit diagram of a sequential selector suitable for the control of a matrix-type memory store.

FIG. 19 shows an assembly which acts as the sequence selector for a matrix-type memory store like that described in FIG. 18.

The return signals from the controlled circuit, by which the end of each sequence is determined, are connected to the inputs FS1. The outputs An serve as inputs for the matrix memory store.

For switching to take place, there must be three signals, the presence of which indicates that the following three conditions are fulfilled:
1. The preceding sequences have taken place.
2. The previous sequence has been completely dealt with, inputs FS1, FS2, FS3, ... FSn.
3. The supply A1 is on.

Once these three signals are present, one of the elements 57 linking the supply to one of the outputs An is released. The condition imposed for the opening of one of the elements 57 excludes any possibility of more than one element being opened simultaneously.

In the initial state of the equipment, all the AND elements 57 are closed. The start of the programme is given by a pneumatic signal from the start input 58. The element 57 in the row A1 opens, subject to the general supply being applied to the input A1. At the end of the first sequence, the end-of-sequence pick-up emits a signal, which is first applied to the input FS1 and then passes through the OR element 59, which has a flap in the stable mid-way position.

Since the flap in the element 57 in row A1 is in the up position and the flap in the element 57 in row A2 is down, pressure rises in the lines 60 and 60a simultaneously, without switching the flap of the OR element 59. The signal in the line 60 causes the element 57 in row A2 to open. The signal in the line 60a causes the element 57 in row A1 to close. Simultaneously, a signal connected to the row A2 passes along the line 61 and operates the NO element 62, permitting the escape of the "start" signal present in the line 63. This arrangement is necessary to prevent the re-opening of the element 57 in row A1. When any one of the elements 57 is closed, the outlet is in communication in this case with the atmosphere, At.

During the operation described above, the first sequence has been started, the supply gas been switched to the output A2 for the second sequence and the escape of the first sequence has been effected.

The programme proceeds in precisely the same manner to the end of the final sequence An. From then on, two modes of operation are possible:

a. No control signal applied to the "automatic repetition" input 64.

The AND element 57 connected to the input 64, which is reserved for external control operations, does not open and the programme stops at that point. A complete renewal of cycle is possible if a control signal be applied to the "automatic repetition" input 64 or to the start input 58.

b. Permanent control signal applied to the "automatic repetition" input 64.

In this case, when the end-of-sequence signal arrives at the input FSn, the element 57 in external control row 65 is opened, the element 57 of the final sequence An being closed simultaneously. The output of the element 57 in the external control row passes via all the NO elements 66 and the OR element 67 and causes the AND element 57 of the first sequence to open. The FS1 return signal operates to provide switching of the second sequence, but simultaneously closes the element 57 in the external control row 65.

The start signal 58 can act on the circuit only if the final sequence has been completed; failing this, there is always a NO element 66 closed.

The signal STOP enables the programme to be stopped in the course of execution and to be resumed only from its commencement. In case of need, manual controls permit partial execution of the programme. The stop signal is obtained by action at 68 on the NO element 69.

The present sequence selector (FIG. 19) can be used unchanged in automatisation circuits of two types:

1. End-of-sequence pick-ups operating at high pressure are available. In that case, the pick-ups are supplied by the same source of fluid as the sequence selector and their outputs are connected to the isolated inputs FS1, FS2, FS3, ... FSn of the sequence selector.

2. End-of-sequence pick-ups operating at low pressure (permanent leakage) are available. In that case, the pick-up feed passes through the matrix memory store programming the operation of a single pick-up for corresponding sequences. The outputs of all the pick-ups are connected to an OR unit having n inputs, the output of which passes through an amplifier and is applied to the sequence selector input FS1. For this mode of operation, all the inputs FS1, FS2, FS3, ... FSn must be joined together.

Should the sequence selector outputs be 10 in number, the circuit in FIG. 19 can be used as a decimal counter for discontinuous signals, which will operate correctly even if all the elements 62 and their lines be dispensed with, along with the elements 66 and their lines. The external control row may also be omitted, but the NO element 69 must remain. This counter is characterised by high-speed operation, because the input signal is propagated through the row FSi and acts simultaneously on all the elements 59.

Figure 17A:
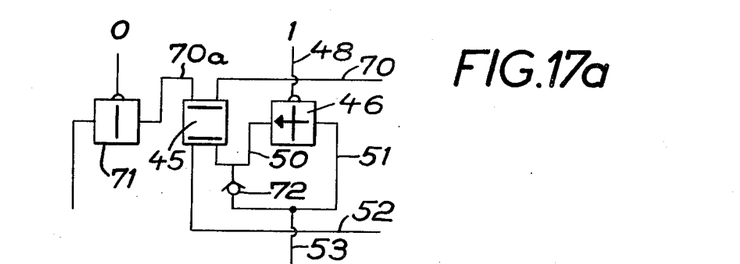
FIGS. 17a and 17b are a circuit diagram and a diagrammatic representation of a basic cell for the assembly of a matrix-type memory store, with outlets for both states.
Figure 17B:
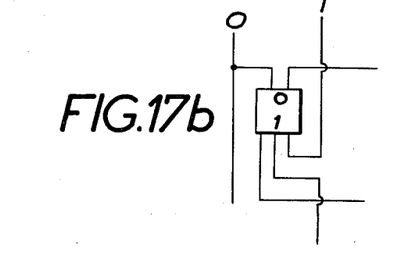

The cell shown in FIGS. 17a and 17b is similar to the one in FIGS. 16a and 16b and is likewise used as a basic cell in assembling a matrix memory store, but differs in that high-pressure signals can be emitted both for the state 1 (flap in the element 45 in the up position) and for the zero state (flap in the element 45 down).

This cell combines two circuit selector elements 46 and 71 with a bistable bilateral element 45 and an isolating valve 72, joined together by a circuit which makes it possible to obtain, in addition to the function mentioned in regard to the circuit in FIG. 16a, high-pressure pneumatic signals at both outputs for both states written.

To read the state of the element 45, the reading signal arrives simultaneously by way of the lines 52 and 70 and passes through the line 50 when the flap in the element 45 is up. Should this flap be down, the signal will pass to the lines 70a. Write-in takes place solely in basic cells having to retain the state 1, as already described and illustrated in FIG. 16a. The erase signal comes from the line 70 alone, which means that it must be at a higher level than the read-out and write-in signals.

Figure 20:
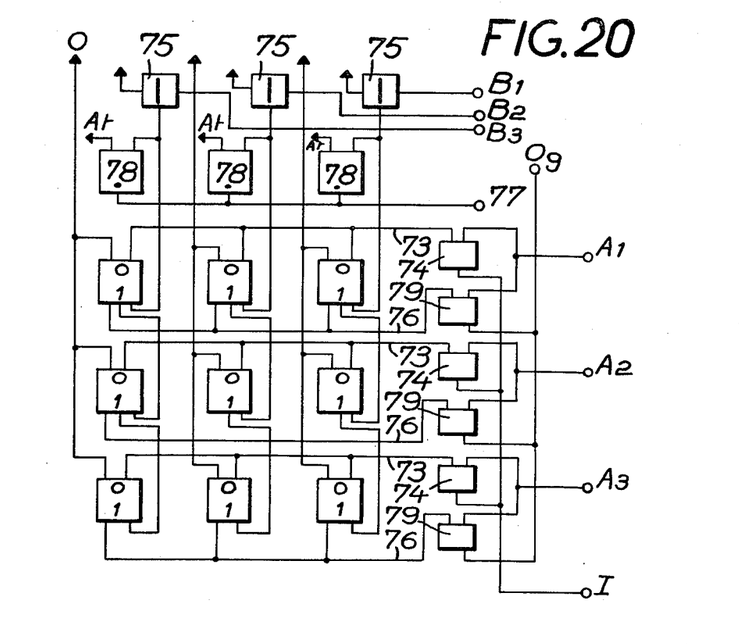
FIG. 20 is a circuit diagram of a matrix-type memory store with outlets for both states.

The matrix memory store shown in FIG. 20 is made with basic cells identical to those in FIGS. 17a and 17b.

Writing into this memory store takes place in a row set in advance to zero, to which signals are applied at the input I, which isolates the rows 73 by action on the NO elements 74 and by the appropriate row An. When signals occur at a certain number of inputs Bn, including more particularly those at which write-in is desired, the appropriate elements 75 are opened and the signals are propagated in the columns concerned.

At the intersection of the columns with the row under pressure, the state 1 is written in. For reading any given row, a signal is applied to the appropriate input Ai and simultaneously signals I, Og and Bn = zero are established. The signal from A passes by way of the lines 73 and 76 and at one or other of the outputs of each column a signal corresponding to the written state is obtained. The end of read-out is marked by connection to atmosphere of the input of the row concerned and by the application of a signal to the input 77, which acts on the YES elements 78 to connect the outputs to atmosphere.

The following read-out becomes possible only when the pressure at the outputs falls below the level taken as 1. Erasure is obtained by the application of a signal to the input Og controlling the NO elements 79, so as to prevent the propagation of signals from A to the bottom parts of all the elements 45, and by applying a signal to the particular input A.

It should be noted that the way in which the matrix memory store described above is made is equivalent to a structure in which every row represents a register.

It is possible to create a three-dimensional structure (block) in which each matrix plate represents one "bit" in the word. Such a memory store offers a far greater capacity for a smaller number of inputs.

The memory stores described here have several advantages: non-destructibility after read-out; absence of noise and stray signals such as occur in memory stores used in electronics, for example; possibility of miniaturisation, because of the limited number of lines passing through the store; no need for the incoming signals to be strictly synchronised; low-cost assembly technique, with stacked plates; and the fact that, when of "block" design, they enable a number of registers at a time to be written or read simultaneously.

Another application of fluid/magnetic elements is to make possible the making of shift registers. By way of example, FIG. 21 shows a register layout in which all the information in the register can be shifted simultaneously, which makes for high-speed operation.

With this register, high-level signals can be emitted through different outputs, both for the 1 state and the zero state in each cell. Read-out from the register can be carried out either during the working period or outside it. The rhythm of the train of signals entering the register is not essential and the register can retain information for an unlimited period.

Figure 21:
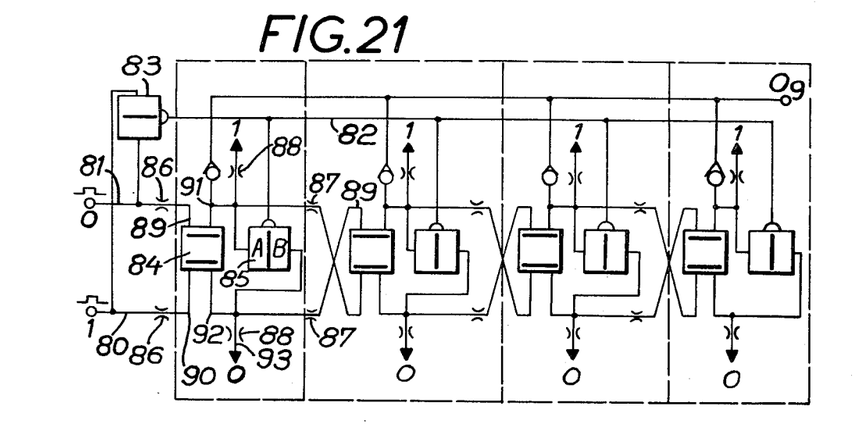
FIG. 21 is a circuit diagram of a shift register.

In the register shown in FIG. 21, the basic cells are separated in broken line. This register consists of four basic cells, but their number is not limited to this form of assembly.

The 1 signals are introduced at the input 80, whereas zero signals are introduced at the input 81. Irrespective of which input is used, these signals are passed by the row 82 by the action of the OR element 83. The row 82 serves for transferring the information in each cell simultaneously to the next cell. Each basic cell is composed of a bistable element with bilateral read-out, 84, and an element, 85, with its flap in a stable mid-way position, used for selecting the two outputs according to the position of the flap in the bistable element 84. The diagram also includes resistors at 86, 87 and 88. The transfer signal in the row 82, at a level of 1, arrives at the input 89 or 90 of the element 84, the delay being determined by the resistor 86. The signal from the row 82 passes through all the elements 85.

Should the flap of the bistable element 84 (in a particular cell) be in its stable down position, the flap of the corresponding element 85 will move to its position A, blocking the path of the signal from the row 82 to the output 91 and simultaneously leaving open the path between the row 82 and the line 92.

If a 1 signal should be applied to the input 90 with the delay already mentioned, the flap in the element 84 will move to the stable up position taken as the state 1 of that element. Simultaneously with the tripping of the element 84, the following two other actions ensue:

a. The signal from the line 92 passes to the line 93 and one obtains an output signal indicating that the state of the cell concerned prior to the action of the last input signal was zero.

b. The signal from the line 78 passes likewise to the line 89 and is applied to the upper part of the element 84 in the next cell. This causes the element to be tripped to zero.

The reading of the register in an intermediate period, without causing any change in the information already put in, can be effected by the application of a signal, at a lower pressure level than the operating signal, to either one of the inputs 80 and 81. Erasure of the information in the register is carried out by the application of a signal to the input Og at a higher pressure than that of the operating signal.

Figure 22:
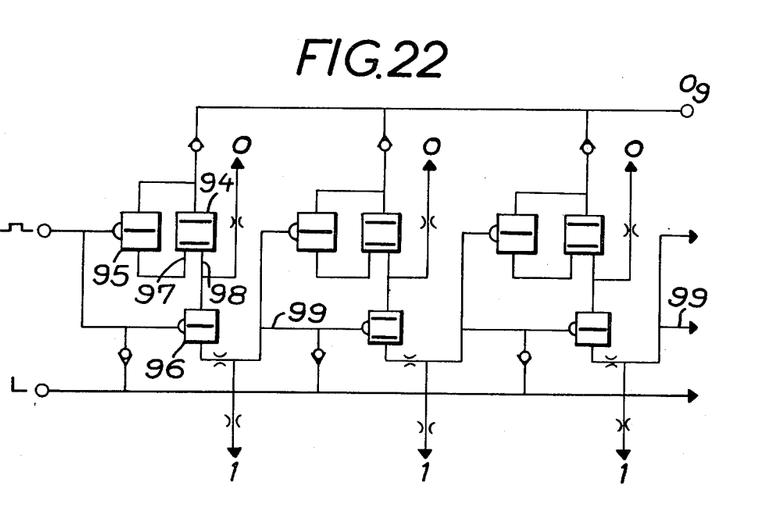
FIG. 22 is a circuit diagram of a binary counter.

The diagram in FIG. 22 also shows a shift register, but one that can function as a binary counter. In this register, the basic cell is composed of a bistable element 94 and two output selector elements 95 and 96. The bistable element 94 moves to the zero state only after the action of one signal and to the state 1 under the action of two simultaneous signals applied to the inputs 97 and 98.

When the first input signal arrives, the flap in the element 95 opens a path to the line 97 and closes the opposite outlet, while the flap in the element 96 allows passage to the line 98. The presence of signals in the lines 97 and 98 causes the flap in the bistable element 94 to move to its stable up position. The incoming signal does not pass to the second basic cell, because the flap of the element 96 in the first cell has barred the way.

All the elements 96 are joined in series, so that a further cell cannot be tripped to the 1 state unless all the preceding cells are already in the 1 state.

The high-speed action of this counter is due to its composition, which presents a very small number of elements 96 in the path of propagation of the signal or of the row 99, which is parallel to the bistable elements.

The counter can be re-set to zero by the application of a signal, at a pressure equal to the input signal pressures, to the row Og. This counter can be read either during the operating time or outside it.

In the latter case, read-out is effected by application of a signal to the input L at a pressure below the input signal pressure.

Various modifications can naturally be made by those skilled in the art, without going beyond the scope of the invention, to the devices or processes described above by way of example only.

We claim:
1. A fluid-operated logic element comprising
means defining a compartment and a plurality of passages communicating with the compartment,
at least one free flap member movable in said compartment by fluid entering the compartment from at least one said passage connected to a fluid-controlled logic circuit, to control intercommunication between at least two of the said passages, and
means coacting magnetically with the member for holding the member in at least one stable position within the compartment, said means defining the compartment and fluid passage comprising,
first and second plates,
an intermediate plate having an aperture therein, and
means securing the first and second plates on opposite sides of the intermediate plate to close the aperture, said first and second plates having said passages therein which communicate with the aperture of the intermediate plate, and wherein said free flap member comprises a permanent magnet, the first and second plates are of non-magnetizable material, and said means coacting magnetically with the free flap member comprises said intermediate plate which is permanently magnetized and defines a stable position for the free flap member that lies intermediate the first and second plates.

* * * * *